United States Patent
Chatterjee et al.

(10) Patent No.: US 10,656,862 B1
(45) Date of Patent: May 19, 2020

(54) SYSTEMS AND METHODS FOR IMPLEMENTING SPACE CONSOLIDATION AND SPACE EXPANSION IN A HORIZONTALLY FEDERATED CLUSTER

(71) Applicant: Amzetta Technologies, LLC, Norcross, GA (US)

(72) Inventors: Paresh Chatterjee, Fremont, CA (US); Raghavan Sowrirajan, Fremont, CA (US); Jomy Jose Maliakal, Duluth, GA (US); Sharon Samuel Enoch, Dacula, GA (US)

(73) Assignee: Amzetta Technologies, LLC, Norcross, GA (US)

( * ) Notice: Subject to any disclaimer, the term of this patent is extended or adjusted under 35 U.S.C. 154(b) by 130 days.

(21) Appl. No.: 15/969,046

(22) Filed: May 2, 2018

Related U.S. Application Data

(60) Provisional application No. 62/500,034, filed on May 2, 2017.

(51) Int. Cl.
*G06F 12/00* (2006.01)
*G06F 3/06* (2006.01)
*G06F 12/1009* (2016.01)

(52) U.S. Cl.
CPC ........... *G06F 3/0647* (2013.01); *G06F 3/067* (2013.01); *G06F 3/0608* (2013.01); *G06F 12/1009* (2013.01); *G06F 2212/1044* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 7,536,529 B1 | 5/2009 | Chatterjee et al. | |
| 7,694,072 B2 | 4/2010 | Nehse | |
| 7,996,608 B1 * | 8/2011 | Chatterjee | G06F 11/2069 711/114 |
| 2013/0046892 A1 | 2/2013 | Otani | |

(Continued)

OTHER PUBLICATIONS

Co-pending U.S. Appl. No. 15/969,056, filed May 2, 2018 and its prosecution history.

(Continued)

*Primary Examiner* — Jason W Blust
(74) *Attorney, Agent, or Firm* — Meunier Carlin & Curfman LLC

(57) ABSTRACT

Systems and methods for consolidating space in a storage cluster are described herein. An example method can include striping a volume across a plurality of storage nodes, and maintaining a cluster volume table (CVT) storing information regarding distribution of a plurality of logical blocks across the storage nodes. The CVT can include a plurality of entries, where each of the entries can include information identifying a respective owner storage node of a respective logical block. The method can also include adding a new storage node to the storage cluster, and transferring data for one or more logical blocks from each of the storage nodes to the new storage node based on respective usage ratios of the storage nodes. The method can further include updating the CVT to identify the new storage node as owner storage node of the one or more logical blocks transferred to the new storage node.

14 Claims, 9 Drawing Sheets

(56) References Cited

U.S. PATENT DOCUMENTS

| | | |
|---|---|---|
| 2016/0018992 A1 | 1/2016 | Takamura et al. |
| 2016/0132523 A1 | 5/2016 | Traeger |
| 2019/0220454 A1 | 7/2019 | Matsui et al. |

OTHER PUBLICATIONS

Co-pending U.S. Appl. No. 15/969,079, filed May 2, 2018 and its prosecution history.

\* cited by examiner

SYSTEMS AND METHODS FOR IMPLEMENTING SPACE CONSOLIDATION AND SPACE EXPANSION IN A HORIZONTALLY FEDERATED CLUSTER

CROSS-REFERENCE TO RELATED APPLICATIONS

This application claims the benefit of U.S. provisional patent application No. 62/500,034, filed on May 2, 2017, and entitled "SYSTEMS AND METHODS FOR IMPLEMENTING SPACE CONSOLIDATION AND SPACE EXPANSION IN A HORIZONTALLY FEDERATED CLUSTER," the disclosure of which is expressly incorporated herein by reference in its entirety.

BACKGROUND

Scalability is a requirement in many data storage systems. Different types of storage systems provide diverse methods of seamless scalability through capacity expansion. In some storage systems, such as systems utilizing redundant array of inexpensive disk (RAID) controllers, it is often possible to add disk drives (or other types of mass storage devices) to a storage system while the system is in operation. In such a system, the RAID controller re-stripes existing data onto the new disk and makes the capacity of the other disks available for new input/output (I/O) operations. This methodology, known as "vertical capacity expansion," is common. However, this methodology has at least one drawback in that it only scales data storage capacity, without improving other performance factors such as the processing power, main memory, or bandwidth of the system.

In other data storage systems, it is possible to add capacity by "virtualization." In this type of system, multiple storage servers are utilized to field I/O operations independently, but are exposed to the initiator of the I/O operation as a single device, called a "storage cluster." Each storage server in a cluster is called a "storage node" or just a "node." When data storage capacity becomes low, a new server may be added as a new node in the data storage system. In addition to contributing increased storage capacity, the new storage node contributes other computing resources to the system, leading to true scalability. This methodology is known as "horizontal capacity expansion."

In a horizontally federated storage system with multiple storage nodes, a volume resides across various storage nodes. The volume is distributed such that each node owns a particular region of the volume. For example, data is striped across multiple storage nodes in conventional horizontally federated storage systems in much the same way as data is striped across disks in RAID arrays.

SUMMARY

The systems and methods described herein are related to the field of storage systems, and particularly to the field of storage servers. The systems and methods described herein provide a highly efficient technique of consolidating space in a heterogeneous storage cluster. Additionally, the systems and methods described herein include a technique for intelligent inline redistribution of data, which ensures optimum storage utilization.

An example computer-implemented method for consolidating space in a storage cluster is described herein. The method can include striping a volume across a plurality of storage nodes, and maintaining a cluster volume table (CVT) storing information regarding distribution of the logical blocks across the storage nodes. When striped, a plurality of logical blocks of the volume can be distributed to the storage nodes. Additionally, the CVT can include a plurality of entries, where each of the entries in the CVT can include information identifying a respective owner storage node of a respective logical block. The method can also include adding a new storage node to the storage cluster, and transferring data for one or more logical blocks from each of the storage nodes to the new storage node based on respective usage ratios of the storage nodes. A portion of the new storage node's storage capacity can be reserved for space consolidation. The method can further include updating the CVT to identify the new storage node as owner storage node of the one or more logical blocks transferred to the new storage node.

Additionally, the method can optionally further include scanning the storage nodes to determine the respective usage ratios of the storage nodes.

Alternatively or additionally, the method can optionally further include normalizing the respective usage ratios of the storage nodes. Optionally, the data for one or more logical blocks can be transferred to the new storage node based on the normalized respective usage ratios of the storage nodes.

Alternatively or additionally, the method can optionally further include receiving a list of logical blocks eligible for transfer from the storage nodes to the new storage node, and populating a transfer array comprising the list of logical blocks eligible for transfer. For example, a logical block eligible for transfer is not associated with a plurality of snapshot versions. Alternatively or additionally, the transfer array can include a plurality of non-contiguous logical blocks.

Alternatively or additionally, the method can optionally further include locking a particular logical block to be transferred to the new storage node. Optionally, the data for one or more logical blocks transferred to the new storage node can include data for the particular logical block.

Alternatively or additionally, the method can optionally further include notifying the storage nodes that the new storage node is the owner storage node for the particular logical block, and unlocking the particular logical block.

Alternatively or additionally, the method can optionally further include redistributing a plurality of unallocated logical blocks based on the respective usage ratios of the storage nodes.

Alternatively or additionally, the method can optionally further include redistributing a plurality of unallocated logical blocks based on the normalized respective usage ratios of the storage nodes.

Alternatively or additionally, a first portion of the new storage node's storage capacity can be reserved for space consolidation and a second portion of the new storage node's storage capacity can be reserved for space redistribution.

Alternatively or additionally, each of the entries in the CVT can further include information identifying a respective owner storage node for remotely-owned logical block or a pointer to a system volume table (SVT) for a locally-owned logical block.

An example computer-implemented method for handling input/output (I/O) operations in a storage cluster during a space crunch is described herein. The method can include striping a volume across a plurality of storage nodes, and maintaining a cluster volume table (CVT) storing information regarding distribution of the logical blocks across the storage nodes. When striped, a plurality of logical blocks of the volume can be distributed to the storage nodes. Additionally, the CVT can include a plurality of entries, where each of the entries in the CVT can include information identifying a respective owner storage node of a respective logical block. The method can also include receiving a write I/O operation directed to an unallocated logical block owned by a landing storage node, where the landing storage node lacks free storage capacity, and locking the unallocated logical block. The method can further include updating the CVT to identify a storage node having free storage capacity as owner storage node of the unallocated logical block, and unlocking the unallocated logical block, wherein the write I/O operation proceeds at the storage node having free storage capacity.

Additionally, the method can optionally further include notifying the storage nodes that the landing storage node lacks free storage capacity, and receiving a notification at the landing storage node from the storage node having free storage capacity.

Alternatively or additionally, the method can optionally further include receiving a write I/O operation directed to an allocated logical block owned by the landing storage node, invalidating a snapshot to reclaim storage capacity, notifying the storage nodes of invalidation of the snapshot, and performing the write I/O operation directed to the allocated logical block.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for space consolidation or space expansion in a horizontally federated cluster, it will become evident to those skilled in the art that the implementations are not limited thereto.

Figure 1:
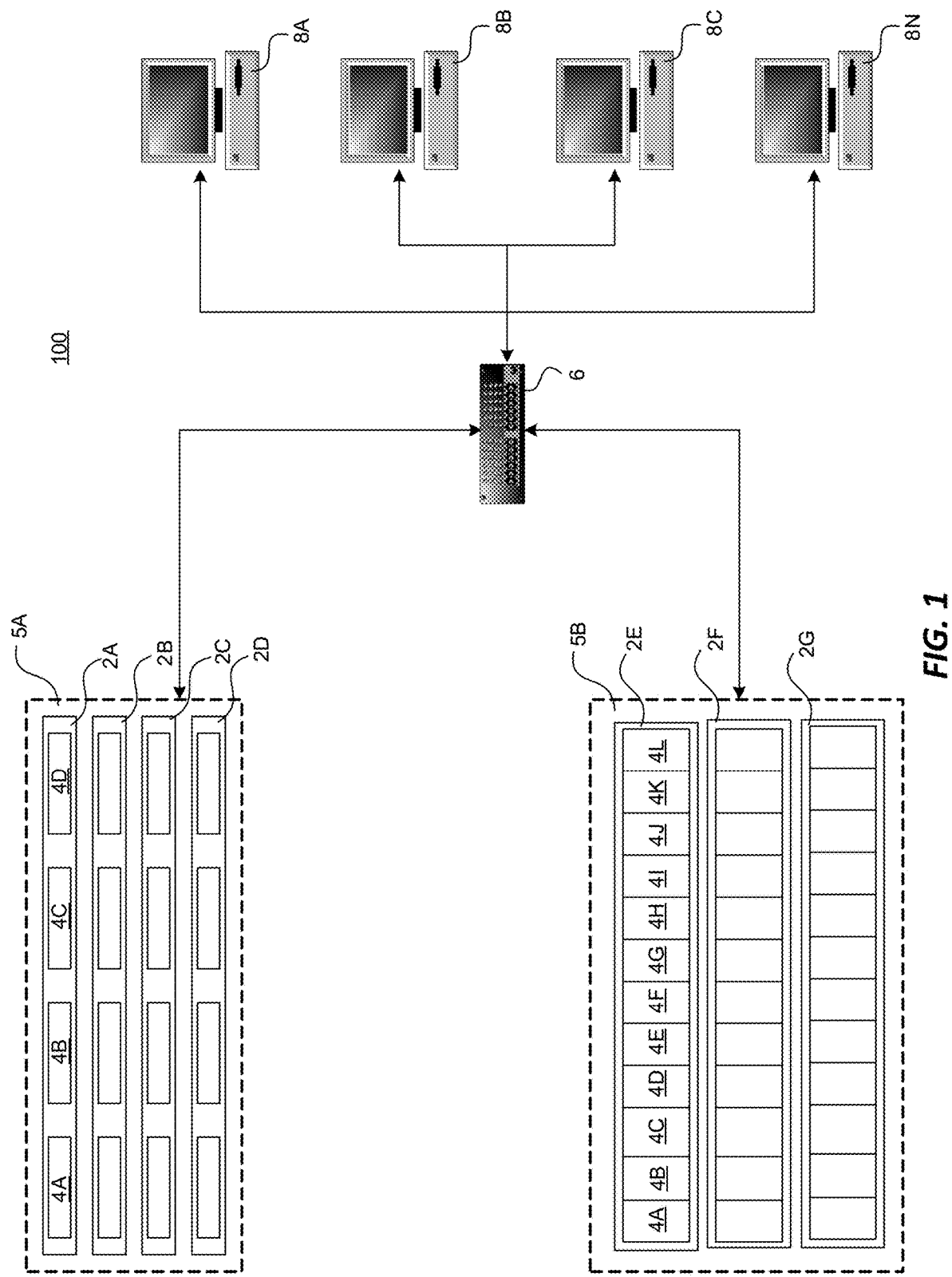
FIG. 1 is a computer architecture and network diagram showing aspects of a computer network and a storage server computer that provides an operating environment for embodiments of the disclosure presented herein.
Figure 2:
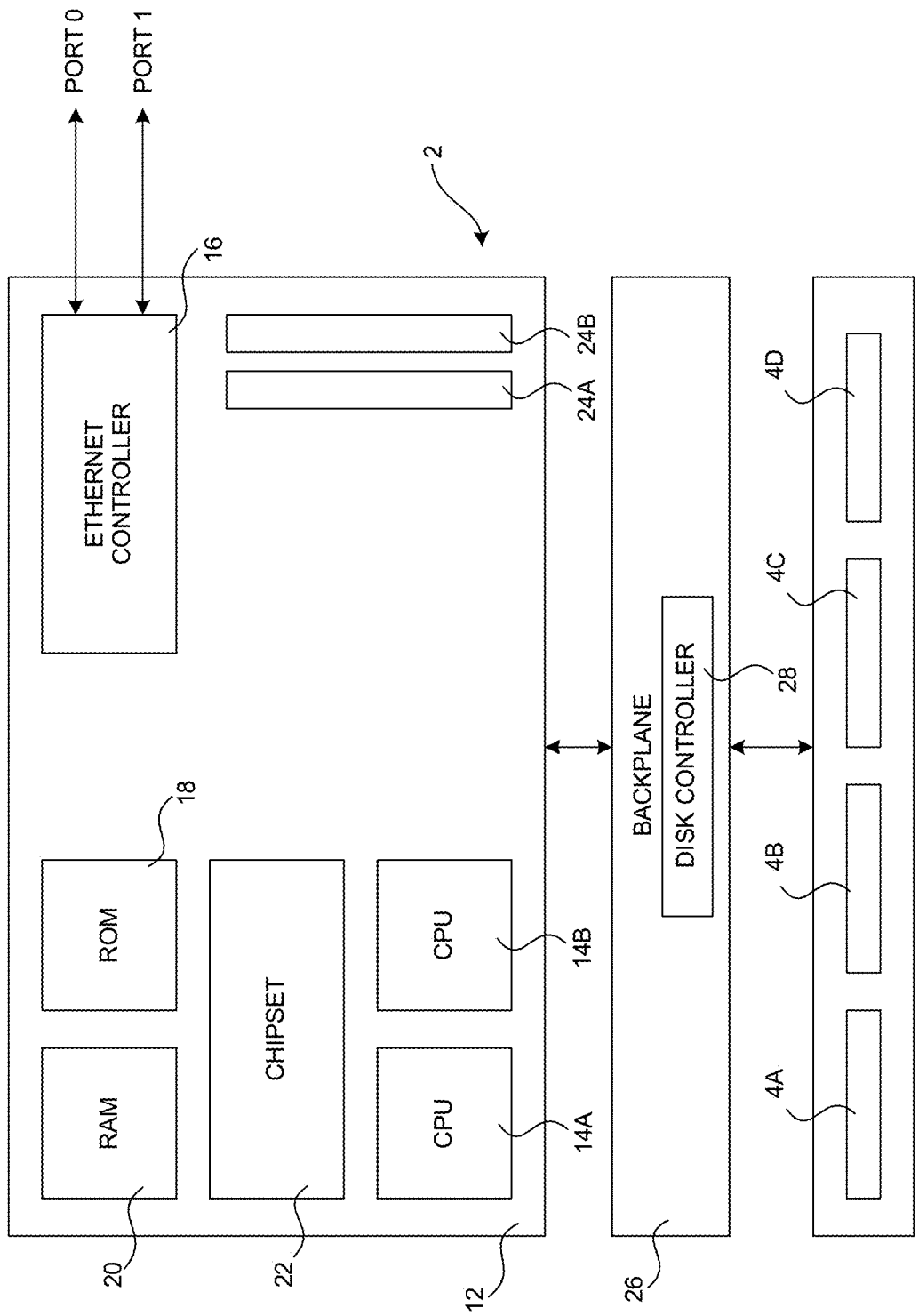
FIG. 2 is a computer architecture diagram illustrating aspects of the hardware of an illustrative storage server computer described herein.

FIGS. 1 and 2 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for implementing space consolidation and space expansion in a storage cluster. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node" or "storage system computer", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

As described below, data may be striped across a plurality of storage nodes. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing multiple nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators", collectively initiators 8). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units (CPUs) 14A-14B, a network adapter, such as the Ethernet controller 16, a system memory, including a Read Only Memory 18 (ROM) and a Random Access Memory 20 (RAM), and other hardware for performing input and output, such as a video display adapter or a universal serial bus port (USB), not all of which are illustrated in FIG. 2. In some implementations, a storage server computer can include dual storage controllers (e.g., left canister (LC) and right canister (RC)), with each of the LC and RC being considered a storage node.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system (BIOS) or Extensible Firmware Interface (EFI) compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment (SATA) interface, a small computer system interface (SCSI), a fiber channel (FC) interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

As noted above, in some implementations, a storage server computer can include dual storage controllers (e.g., left canister (LC) and right canister (RC)), with each of the LC and RC being considered a storage node. Each individual storage controller (e.g., LC and RC) can include a motherboard (e.g., motherboard 12 of FIG. 2) including CPU, chipset, RAM, ROM, Ethernet controller, and/or hardware slots as described above. Each storage controller can be connected to the hard disk drives 4A-4D through a common backplane (e.g., backplane 26 of FIG. 2). Optionally, each storage controller can include a disk controller (e.g., disk controller 28 of FIG. 2) for communicating with the hard disk drives 4A-4D. In this case, a disk controller can be provided on the motherboard of each storage controller. In one embodiment, the physical and electrical structure of the common backplane may be based upon the storage bridge bay ("SBB") specification. The SBB specification defines mechanical, electrical, and low-level enclosure management requirements for a single enclosure that supports the connection of multiple storage controllers as well as multiple physical disks (e.g., hard disk drives 4A-4D) from a variety of hardware and system vendors. The SBB mid-plane provides the common backplane that allows multiple storage controllers to be connected to and communicate with the physical disks concurrently.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

As described above, horizontal federation results in data being spread across a plurality of storage nodes, i.e., a volume exists across multiple storage nodes. Additionally, vertical federation results in data being spread across a plurality of disks such as a Redundant Array of Inexpensive Disks (RAID). In a data storage system implementing both horizontal federation and vertical federation, a volume can be spread across multiple RAID arrays and also across multiple storage nodes. A distributed volume management (DVM) for horizontal and vertical federation can have two parts. The first part provides a global view of the volume, i.e., it can store data placement information pertaining to all of the storage nodes. A first table—a cluster volume table (CVT) as described herein—can provide the global view of the volume. The second part provides a local data residency view of volume data owned by a particular storage node, i.e., it can store data placement information pertaining to a particular storage node. A second table—a system volume table (SVT) as described herein—can provide the local data residency view of volume data. In other words, the DVM module for horizontal and vertical federation can maintain at least two separate tables, i.e., the CVT and the SVT as described herein.

Figure 3A:
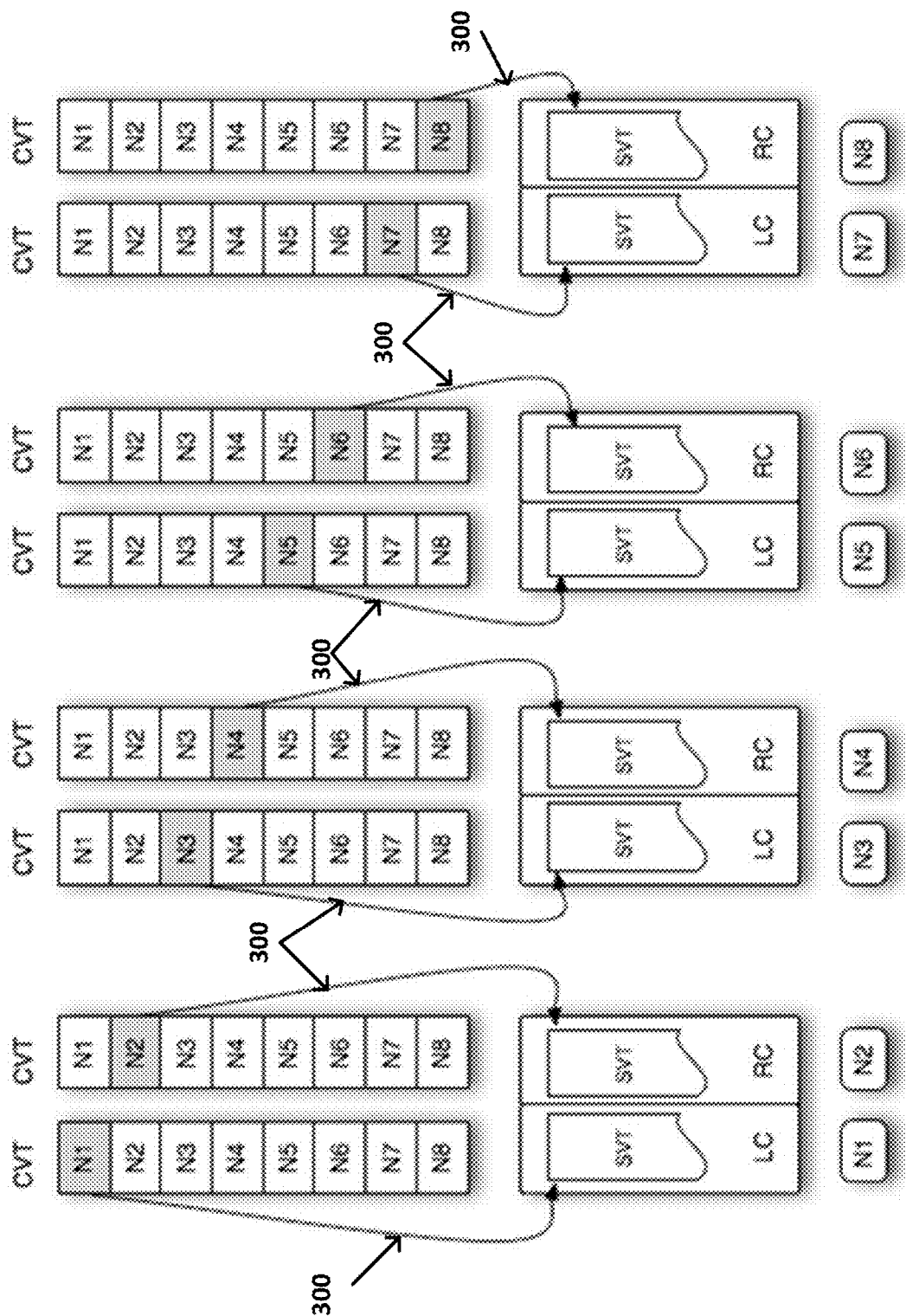
FIG. 3A is a diagram illustrating a volume distributed at 8 MB granularity across a plurality of storage nodes (e.g., storage nodes N1-N8).

Referring now to FIG. 3A, a volume distributed at 8 MB granularity across a plurality of storage nodes (e.g., Nodes N1-N8) is shown. A CVT can be maintained for storing information about data distribution of the volume across the storage nodes. For a volume with size Vg residing across multiple storage nodes (e.g., Nodes N1-N8), each storage node maintains a CVT, which includes a plurality of entries representing the entire volume size Vg. In other words, each one of Nodes N1-N8 maintains its own CVT as shown in FIG. 3A. It should be understood that the CVT maintained by each of Nodes N1-N8 is the same, i.e., it provides the same global view of the volume. The CVT can be an array of bits that contains information concerning the distribution of the volume across the storage nodes. The CVT can include a plurality of entries, where each of the entries in the CVT can include information identifying a respective owner storage node for a respective logical block (e.g., a territory) of the volume. For example, each of the entries can store 8 bits to identify the respective owner storage node number for a respective logical block of the volume. It should be understood that the size of the information identifying an owner storage node (e.g., 8 bits) is provided only as an example and that this information can be more or less than 8 bits.

Each storage node, however, accounts for (i.e., owns) only a part of the entire volume. Each of the storage nodes (e.g., Nodes N1-N8) also maintains an SVT for mapping data to physical storage owned by the particular storage node. In other words, each one of Nodes N1-N8 maintains its own SVT as shown in FIG. 3A. Unlike the CVTs, the SVTs maintained by Nodes N1-N8 are unique to each particular storage node, i.e., each provides the local data residency view of the portion of the volume data owned by the particular storage node. As shown in FIG. 3A, entries in a CVT corresponding to locally owned logical blocks can have a pointer 300 to the storage node's SVT. It should also be understood that the CVT is the metadata table storing information about the distribution of the volume across the storage nodes. Further, this disclosure contemplates that the CVT can be stored by a storage node (e.g., storage server computer 2 of FIG. 2). In some implementations, a storage server computer can include dual storage controllers (e.g., left canister (LC) and right canister (RC)), with each of the LC and RC being considered a storage node.

Figure 3B:
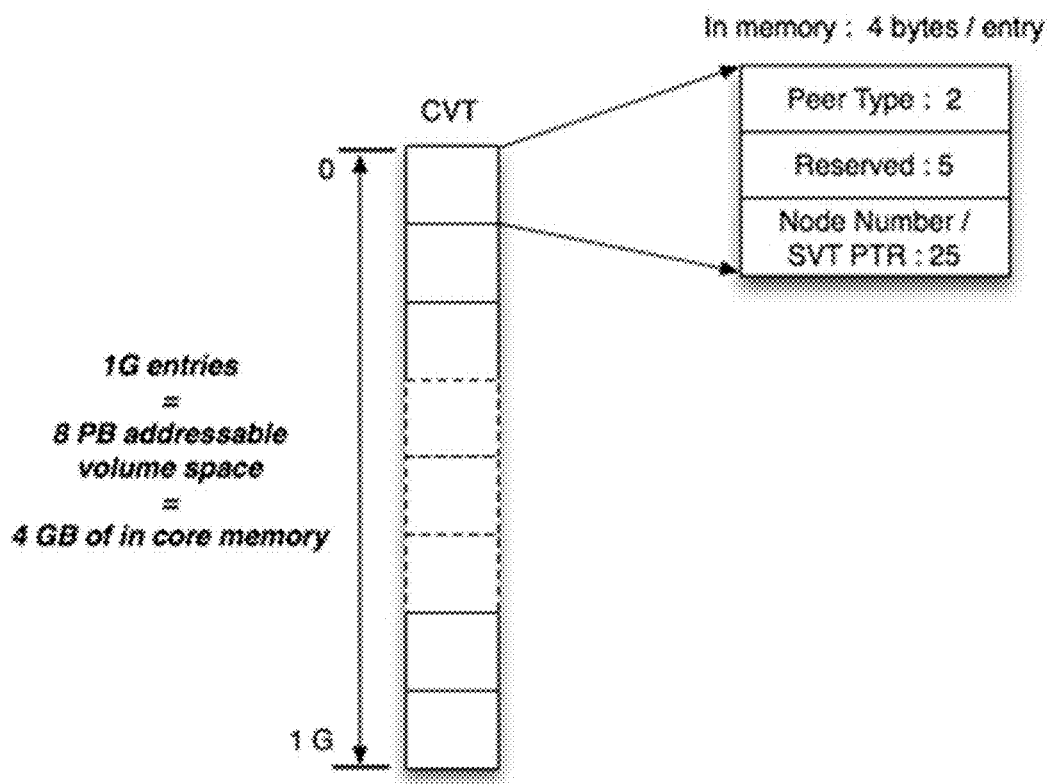
FIG. 3B illustrates an example cluster volume table (CVT) as stored in memory of a particular storage node.

Volume tables such as SVT's are known in the art, for example, as described in U.S. Pat. No. 7,536,529, issued May 19, 2009 to Chatterjee et al., entitled "Method, System, Apparatus, and Computer-Readable Medium for Provisioning Space in a Data Storage System." The SVT can include a plurality of segments storing information mapping data to physical storage owned by the storage node. For 8 MB logical block level granularity, each segment can be used to account for 8 MB of physical storage. The segment in the SVT contains information regarding the actual disk location of where the 8 MB data resides. Entries in the CVT associated with locally-owned logical blocks can include a pointer to an SVT. Accordingly, this provides mapping (e.g., via the SVT) to physical storage owned by the storage node. A segment in the SVT also includes eight SVT entries, each SVT entry mapping to a 1 MB region of physical storage. Each SVT entry also has a sequence number to track a snapshot to which the 1 MB data belongs. The 1 MB regions belonging to all the snapshots are maintained as a list. This disclosure contemplates that an entry in the CVT can store information identifying the owner storage node of a logical block. When the logical block is locally-owned, a pointer to an SVT pointer can be stored in the CVT entry. Alternatively, when the logical block is remotely-owned, a node number can be stored in the CVT entry. Referring now to FIG. 3B, the CVT as stored in memory of a particular storage node, which includes both the Node Number and the local data residency information for the particular storage node (e.g., the SVT pointer), is shown. Optionally, each entry in the CVT can be 4 bytes, including a Peer Type field (2 bits), a Reserved field (5 bits), and a Node Number/SVT Pointer field (25 bits). The Peer Type field can be used to indicate whether the logical block is locally owned, e.g., a locally-owned logical block set to 00 or a remotely-owned logical block set to 01. If the entry in the CVT is associated with a locally-owned logical block, then the Node Number/SVT Pointer field includes a segment identifier of a segment of the SVT. On the other hand, if the entry in the CVT is associated with a remotely-owned logical block, then the Node Number/SVT Pointer field includes only the Node Number. The CVT stored in memory contains local data residency information pertaining to the particular storage node. Thus, entries in the in-memory CVT can be place holders each with the size of a segment identifier (e.g., 25 bits in length).

Optionally, the granularity of the CVT can be logical-block-level granularity such as a territory (8 MB), i.e., territory-level granularity. Thus, each entry of the CVT can store information identifying the owner storage node number (e.g., an 8-bit array) accounting for that volume territory. It should be understood that 8 MB territory-level granularity is provided only as an example and that a territory can be more or less than 8 MB. For example, the CVT can be an array including a plurality of entries storing information identifying Node N1 as the owner storage node of territory 1 (i.e., 0-8 MB), Node N2 as the owner storage node of territory 2 (i.e., 8-16 MB), Node N3 as the owner storage node of territory 3 (i.e., 16-24 MB), Node N4 as the owner storage node of territory 4 (i.e., 24-32 MB), Node N5 as the owner storage node of territory 5 (i.e., 32-40 MB), Node N6 as the owner storage node of territory 6 (i.e., 40-48 MB), Node N7 as the owner storage node of territory 7 (i.e., 48-56 MB), and Node N8 as the owner storage node of territory 8 (i.e., 56-64 MB), etc. It should be understood that the number of storage nodes (e.g., 8 storage nodes) and/or the granularity of data distribution (e.g., 8 MB) can be more or less than those shown in FIG. 3A, which is provided as an example only.

As noted above, in some implementations, a storage server computer can include dual storage controllers (e.g., left canister (LC) and right canister (RC)), with each of the LC and RC being considered a storage node. In this implementation, it should be understood that one of the storage controllers may fail. For example, in the event of failure of a LC, both Node N1 and Node N2 can reside in RC temporarily until LC is operational. In this scenario, there is no change to the CVT, but Node N2 can maintain two SVTs, i.e., one SVT belonging to the storage pool owned by Node N1 and one SVT belonging to the storage pool owned by Node N2. It should be understood that this scenario is provided only as an example, and that controller failure may occur for other nodes.

Figure 4:
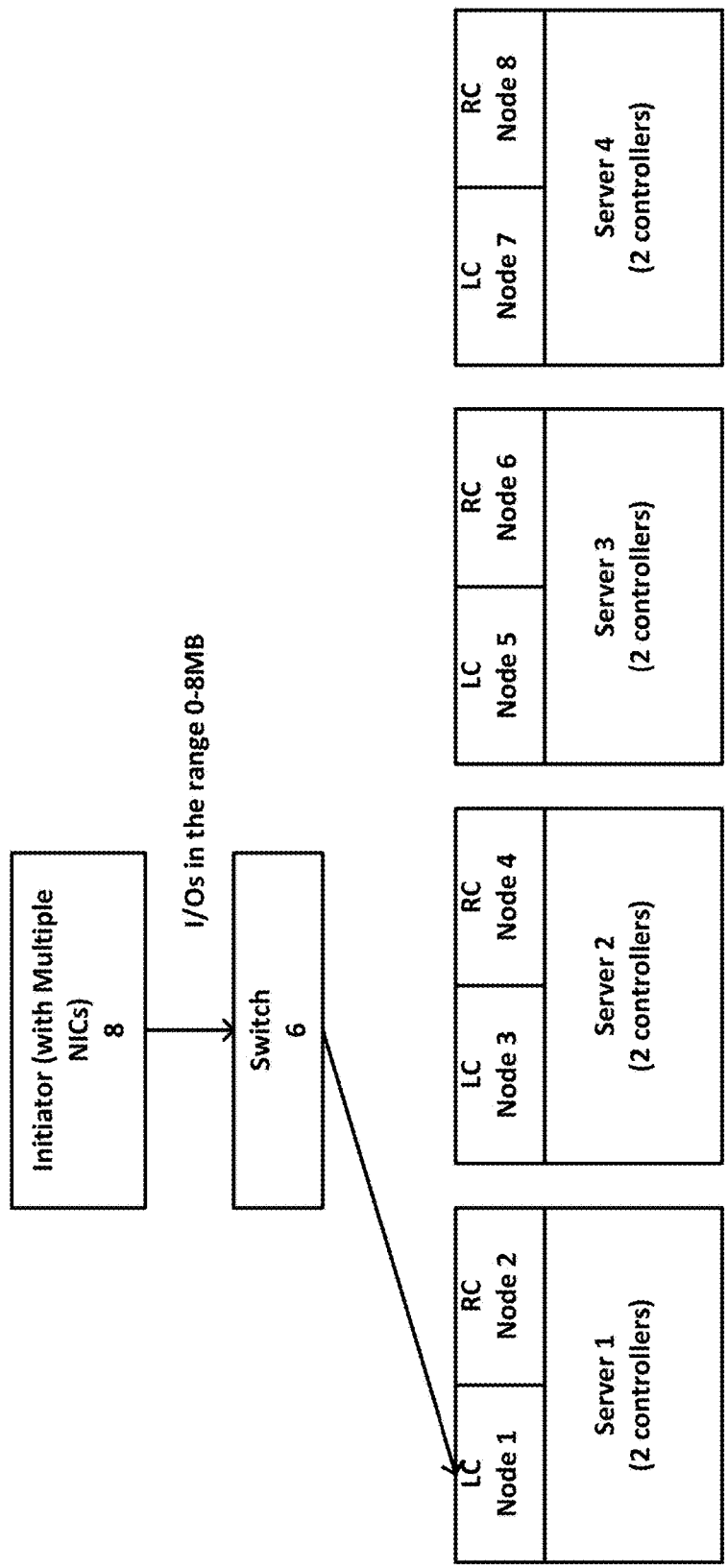
FIG. 4 is a block diagram illustrating a computing environment where I/O operations are owned at territory-level (e.g., 8 MB).

Referring now to FIG. 4, a block diagram illustrating a computing environment where I/O operations are owned at territory-level (e.g., 8 MB) is shown. The computing environment includes initiators 8, network switch 6, and a plurality of storage nodes (e.g., Nodes N1-N8). As described with regard to FIG. 1, the initiators 8 can be operably connected to the storage nodes Nodes N1-N8 via the network switch 6. Additionally, a storage node can be a storage server computer as described with regard to FIG. 2. Alternatively or additionally, a storage server computer can include dual storage controllers (e.g., left canister (LC) and right canister (RC)), with each of the LC and RC being considered a storage node. Referring again to FIG. 4, the data is distributed at territory-level granularity (e.g., 8 MB) as shown in FIG. 3A. Thus, when an I/O operation is directed to the region 0-8 MB (e.g., territory 1) as shown in FIG. 4, for example, it is served by Node N1 if it lands on Node N1 or redirected to Node N1 for service if it lands on Nodes N2-N6. The owner storage node associated with the region 0-8 MB (e.g., Node N1 in the example shown in FIG. 4) can be identified by referencing the CVT. It should be understood that a sequential burst of I/O operations directed to the region 0-8 MB (e.g., territory 1) would be served by Node N1 in the example shown in FIG. 4.

This disclosure contemplates that a federated storage cluster can include a plurality of storage nodes (e.g., storage node 2 of FIGS. 1 and 2), each of the storage nodes having various sizes. The volumes can optionally be distributed/striped across the storage nodes in a manner related to the storage node sizes. Optionally, a factor can be used to determine a number of logical blocks distributed to a storage node for each stripe when striping the volume across multiple storage nodes. This facilitates including asymmetrical storage nodes in the storage cluster. The individual storage nodes can be of variable sizes, and in such a case, the striping has a factor that determines the number of logical blocks to be distributed to each storage node every stripe. For example, for three storage nodes having capacities of 100 TB, 200 TB, and 150 TB, factors of 1×, 2×, and 1.5×, respectively, can be used when striping data. In some instances, the pattern of write I/O operations to a volume can be such that a single storage node is more heavily accessed as compared to other storage nodes in the storage cluster. The presence of snapshots can aggravate this situation. Hence, there is a need for consolidating storage space of the storage cluster. In addition, the storage space of the storage cluster can expanded vertically as well as horizontally. Hence, there is a need for space redistribution.

Figure 5:
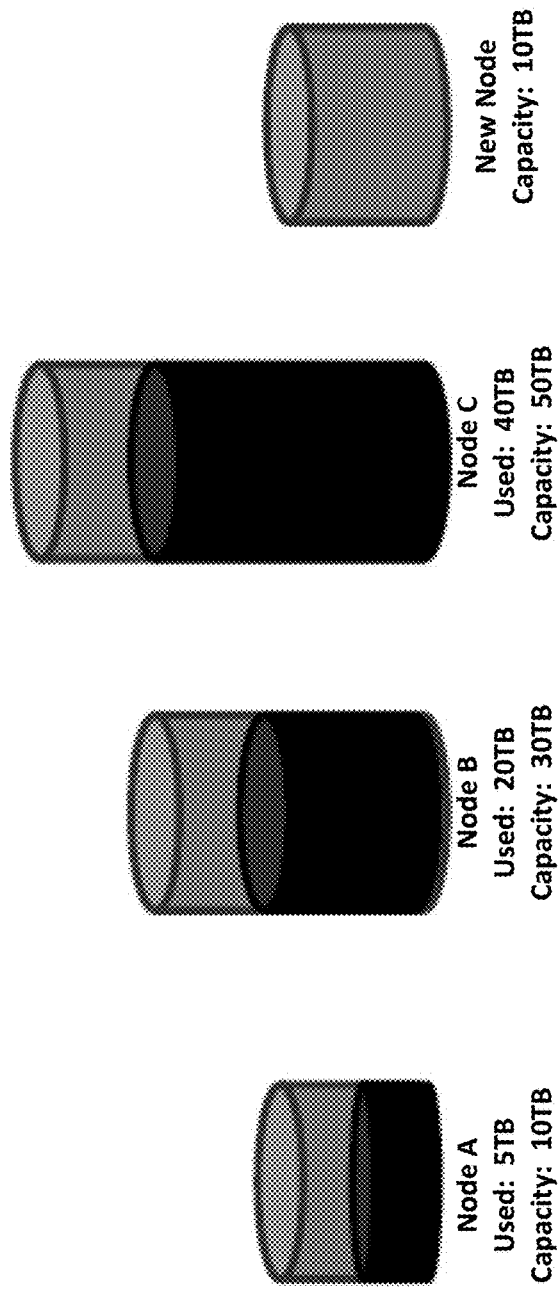
FIG. 5 is a diagram illustrating the addition of a new storage node to a storage cluster.

Referring now to FIG. 5, a diagram illustrating the addition of a new storage node in a storage cluster is shown. The existing storage cluster includes Node A, Node B, and Node C. Each of Nodes A-C can be a computer such as storage node 2 of FIGS. 1 and 2, for example. Node A has a storage capacity of 10 TB with 5 TB of used storage capacity (1/2 usage ratio). Node B has a storage capacity of 30 TB with 20 TB of used storage capacity (2/3 usage ratio). Node C has a storage capacity of 50 TB with 40 TB of used storage capacity (4/5 usage ratio). The new node (i.e., the storage node being added to the existing storage cluster) has a capacity of 10 TB. It should be understood that the number and/or capacities of the storage nodes shown in FIG. 5 are provided only as examples. This disclosure contemplates implementing the systems and methods described herein in storage clusters having different numbers of and/or sized storage nodes.

As described herein, storage space can be added either vertically (e.g., vertical capacity expansion) or horizontally (e.g., horizontal capacity expansion). For example, vertical capacity expansion can occur up to 256 TB and horizontal storage capacity expansion can occur up to 8 PB. It should be understood that the maximum capacities for vertical and horizontal capacity expansion are provided only as examples. In the case of vertical capacity expansion, a new disk(s) is added to the storage system, and the new disk(s) can be accessed by one of the storage nodes. In the case of horizontal capacity expansion, a new storage node(s) is added to the storage system. As shown in FIG. 5, New Node is added to the existing storage cluster that includes Nodes A-C. The new storage node can be prepared for addition to the storage cluster. Optionally, a first portion of the new storage node's storage capacity can be reserved for space consolidation, and a second portion of the new storage node's storage capacity can be reserved for space redistribution. In some implementations, for example, half (i.e., 50%) of the new storage node's capacity can be reserved for space consolidation (e.g., data movement) and the other half (i.e., 50%) of the new storage node's capacity can be reserved for space redistribution (e.g., mapping changes). It should be understood that the 50-50 space consolidation-space redistribution ratio is provided only as an example and that other ratios can be used.

The existing storage nodes (e.g., Nodes A-C in FIG. 5) can be scanned to determine their respective ratios of usage. As shown in FIG. 5, Nodes A, B, and C have usage ratios of 1/2, 2/3, and 4/5, respectively. As described herein, the respective usage ratios can be used when transferring data from Nodes A, B, and C to New Node. Optionally, the respective usage ratios of Nodes A, B, and C can be normalized to 15/59, 20/59, and 24/59, respectively. This can be accomplished using the equivalent fractions of 15/30, 20/30, and 24/30, respectively, for the respective usage ratios of Nodes A, B, and C. The sum of the numerators of the equivalent fractions (e.g., 15+20+24=59) can serve as the denominator for normalization of the usage ratios. As described herein, the normalized respective usage ratios can be used when transferring data from Nodes A, B, and C to New Node.

As shown in FIG. 5, the new storage node added to the storage cluster—New Node—has a capacity of 10 TB. A portion of New Node's storage capacity, e.g., 5 TB, can be set aside for space consolidation. As noted above, Nodes A, B, and C have usage ratios of 1/2, 2/3, and 4/5, respectively. The normalized usage ratios for Nodes A, B, and C are 15/59, 20/59, and 24/59, respectively. One or more logical blocks can be moved from each of Nodes A, B, and C to New Node according to the respective usage ratios. For example, data movement can be accomplished according to the normalized usage ratios for Nodes A, B, and C of 15/59, 20/59, and 24/59, respectively. In this way, 15/59 of the 5 TB capacity of New Node reserved for space consolidation can be filled by Node A, 20/59 of the 5 TB capacity of New Node reserved for space consolidation can be filled by Node B, and 24/59 of the 5 TB capacity of New Node reserved for space consolidation can be filled by Node C. It should be understood that the numerical free storage capacity value for Nodes A, B, and C (e.g., 5 TB, 10 TB, 10 TB) is not considered in the data movement technique described above. For example, a usage ratio of 1/2 with 1 TB used out of 2 TB capacity would get less preference for data movement than a usage ratio of 9/10 with 90 TB used out of 100 TB capacity. In other words, even though one storage node has just 1 TB of free space, while another storage node has 10 TB of free space, it is expected that initial striping would have assigned less volume space to the 2 TB node, while assigning more volume space to the 100 TB node.

After determining respective usage ratios as described herein, a master storage node (e.g., any one of Nodes A, B, or C in the storage cluster) can obtain a list of logical blocks eligible for transfer from Nodes A, B, and C to New Node. As described herein, a logical block can optionally be a territory (an 8 MB logical block), i.e., territory-level granularity. Although territory-level granularity is used in the example herein, this disclosure contemplates using logical blocks at granularity other than a territory. Optionally, a logical block eligible for transfer is not associated with a plurality of snapshot versions. In other words, a criterion for transferability can optionally be that the logical block (e.g., a territory) does not have a chain of snapshots associated with it. The objective is to avoid moving logical blocks (e.g., territories) that are intertwined with snapshots. As described herein, SVTs provide the local data residency view of volume data, including snapshot information. To avoid having to move/update SVTs and associate pointers, logical blocks eligible for transfer to New Node can be limited to those not associated with a plurality of snapshot versions (e.g., a logical block without multiple snapshot content). Once the list of logical blocks is populated, the master storage node can scan the list and populate a transfer array. The master storage node can store the transfer array in memory, for example. Optionally, the master storage node can ensure that a receiving storage node receives a plurality of non-contiguous logical blocks, i.e., the list of logical blocks lacks contiguous logical blocks (e.g., contiguous territories) for transfer to any given receiving node.

The master storage node can then inform each of Nodes A, B, and C of the transfer array, and each of Nodes A, B, and C can proceed with transferring data to New Node. In particular, a storage node transferring data to New Node can proceed by locking a particular logical block(s) to be transferred to New Node and sending data for the particular logical block(s) to New Node (e.g., transferring the entire territory, mentioning the snapshot sequence at provision-level granularity). The receiving storage node (e.g., New Node) can optionally lock the particular logical block. Although locking is not necessary at the receiving storage node, this will avoid multiple hops to write data to the receiving storage node. Following transfer of data to New Node, the transferring storage node can inform the storage cluster of the ownership change and unlock the particular logical block(s). Each of Nodes A, B, and C can then update its respective CVT to identify New Node as owner storage node of the particular logical block(s). As described above, appropriate entries in the CVTs maintained by the storage nodes can be updated to reflect the changes in ownership of logical blocks. In addition, New Node (e.g., the new owner storage node of the particular blocks(s)) can update its pointers to the appropriate SVT, which provides the local data residency view of volume data.

After the data movement on a space addition, the unallocated territories can optionally be redistributed. The redistribution can follow the same ratio-based technique as described herein for space consolidation. In some implementations, a plurality of unallocated logical blocks can be redistributed based on the respective usage ratios of Nodes A, B, and C (e.g., usage ratios of 1/2, 2/3, and 4/5, respectively). In other implementations, a plurality of unallocated logical blocks can be redistributed based on the normalized respective usage ratios of Nodes A, B, and C (e.g., normalized usage ratios of 15/59, 20/59, and 24/59, respectively). In addition, the redistribution can be done inline, as during a space crunch. This will offer real time information on the volume territories that are used currently, and which can be redistributed for performance.

Figure 6:
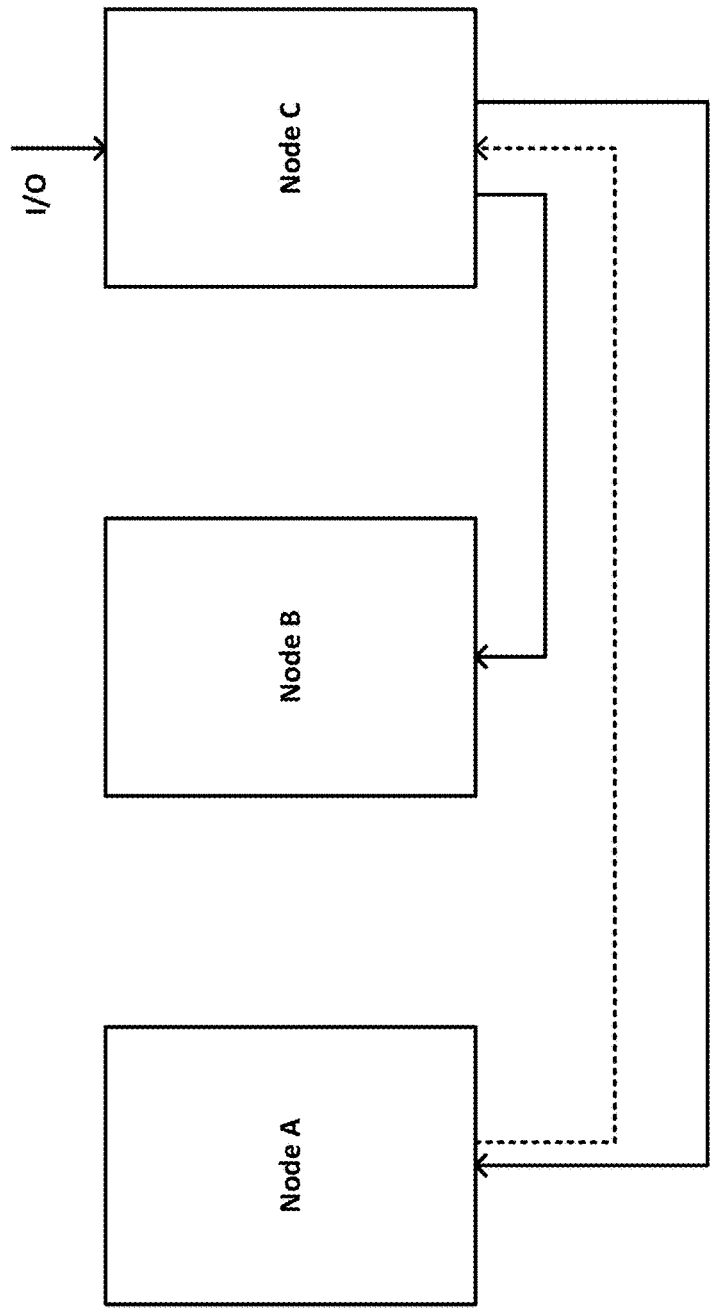
FIG. 6 is a diagram illustrating the handling of write I/O operations in a storage cluster during a space crunch.

Referring now to FIG. 6, a diagram illustrating the handling of write I/O operations in a storage cluster during a space crunch is shown. The storage cluster includes Node A, Node B, and Node C. Each of Nodes A-C can be a computer such as storage node 2 of FIGS. 1 and 2, for example. A space crunch occurs when a storage node upon which a write I/O operation lands (e.g., a landing storage node) lacks free storage capacity to serve the write I/O operation. As described herein, there are two different scenarios for handling write I/O operations during the space crunch. In the event the write I/O operation is for a volume logical block (e.g., a territory) that has already been allocated and written to during a previous snapshot instance, the write I/O operation can be accommodated in the previously allocated space by invalidating a snapshot. In other words, the landing storage node can invalidate a snapshot to free storage capacity and then can serve the write I/O operation from the freed storage capacity. The landing storage node can notify the storage nodes in the storage cluster of invalidation of the snapshot since the invalidation would be across the storage cluster. On the other hand, in the event the write I/O operation is for an unallocated volume logical block (e.g., a territory), free space can be obtained from another node in the storage cluster as described below with reference to FIG. 6.

The write I/O operation directed to an unallocated logical block owned by Node C (e.g., the landing storage node) is received at Node C. As noted above, there is a space crunch, so Node C lacks storage capacity to serve this write I/O operation. Node C therefore locks the unallocated logical block so that further I/O requests directed to the unallocated logical block do not get processed. Node C also notifies the other storage nodes (e.g., Nodes A and B) that Node C lacks storage capacity. This notification is shown by the solid lines in FIG. 6. Optionally, the same unallocated logical block can be locked by the other storage nodes (e.g., Nodes A and B) in the storage cluster. Although locking is not necessary at the other storage nodes, this will avoid multiple hops to write data. Then, Node C can receive a notification from another storage node (e.g., Node A) having free storage capacity. In other words, at least one of the other storage nodes in the storage cluster offers free space for serving the write I/O operation. This is shown by the dotted line in FIG. 6. Each of Nodes A, B, and C can then update its respective CVT to identify Node A as owner storage node of the unallocated logical block. As described above, appropriate entries in the CVTs maintained by the storage nodes can be updated to reflect the changes in ownership of logical blocks. Additionally, the write I/O operation can be logged (e.g., journaled) by the appropriate storage nodes. In addition, Node A (e.g., the new owner storage node of the unallocated logical block) can update its pointers to the appropriate SVT, which provides the local data residency view of volume data. Thereafter, Node C can unlock the unallocated logical block, and the write I/O operation can proceed at Node A. This disclosure contemplates that there may be increased latency for this write I/O operation. The write I/O operation can be expected to complete within the timeout period and any timed-out I/O operation can be re-tried.

It should be appreciated that the logical operations described herein with respect to the various figures may be implemented (1) as a sequence of computer implemented acts or program modules (i.e., software) running on a computing device (e.g., the storage server computer described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 7:
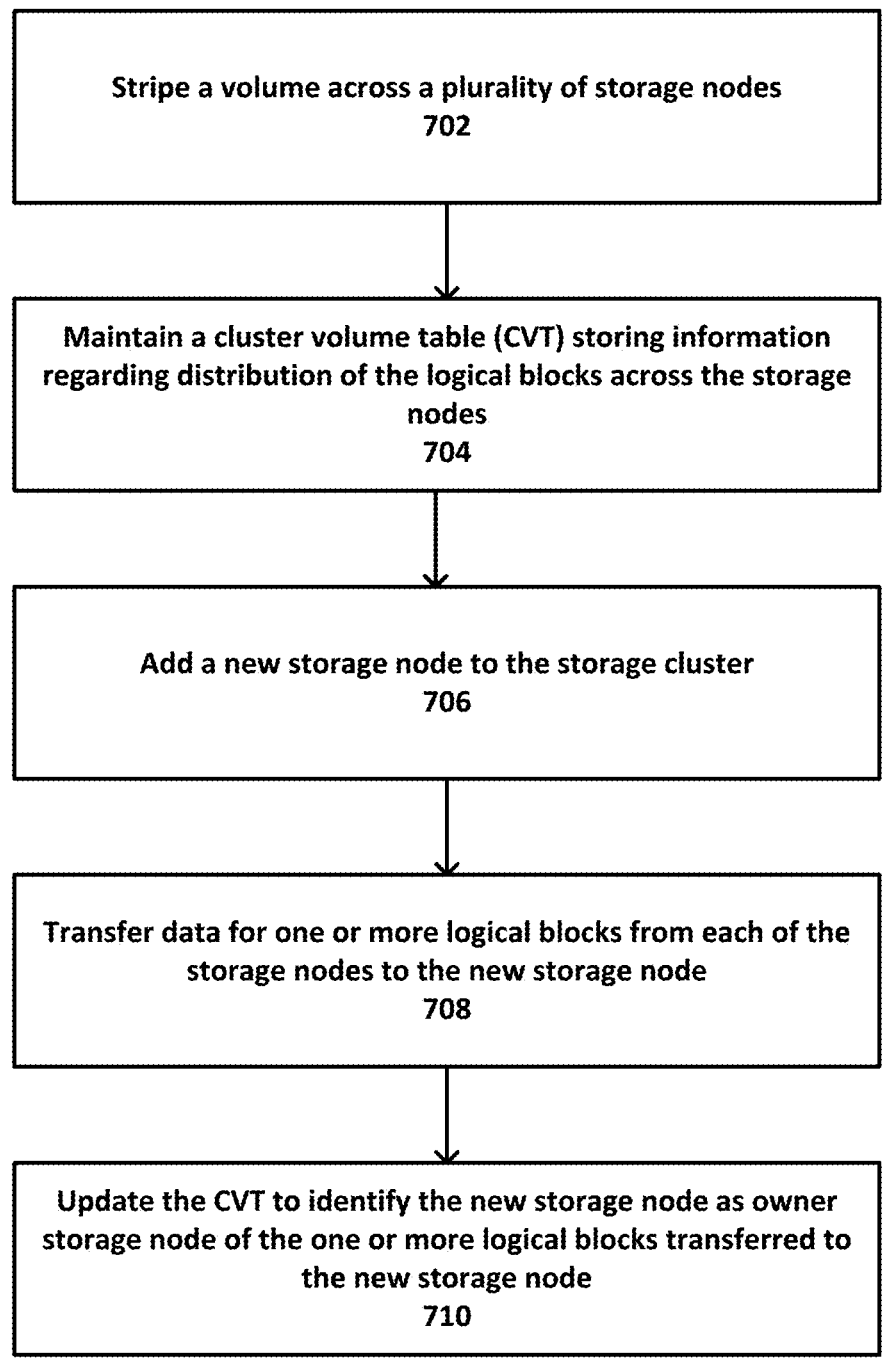
FIG. 7 is a flow diagram illustrating example operations for consolidating space in a storage cluster.

Referring now to FIG. 7, a flow diagram illustrating example operations for consolidating space in a storage cluster is shown. At 702, a volume can be striped across a plurality of storage nodes. A plurality of logical blocks of the volume can be distributed to the storage nodes, for example, as described with regard to FIGS. 3 and 4. At 704, a cluster volume table (CVT) storing information regarding distribution of the logical blocks across the storage nodes can be maintained. The CVT can include a plurality of entries, where each of the entries in the CVT can include information identifying a respective owner storage node of a respective logical block. An example CVT is described above with regard to FIG. 3A. At 706, a new storage node can be added to the storage cluster, for example, New Node as described with regard to FIG. 5. A portion of the new storage node's storage capacity can be reserved for space consolidation. At 708, data for one or more logical blocks can be transferred from each of the storage nodes (e.g., Nodes A, B, and C of FIG. 5) to the new storage node (e.g., New Node of FIG. 5). As described herein, data transfer can be accomplished using respective usage ratios of the storage nodes. At 710, the CVT can be updated to identify the new storage node as owner storage node of the one or more logical blocks transferred to the new storage node.

Figure 8:
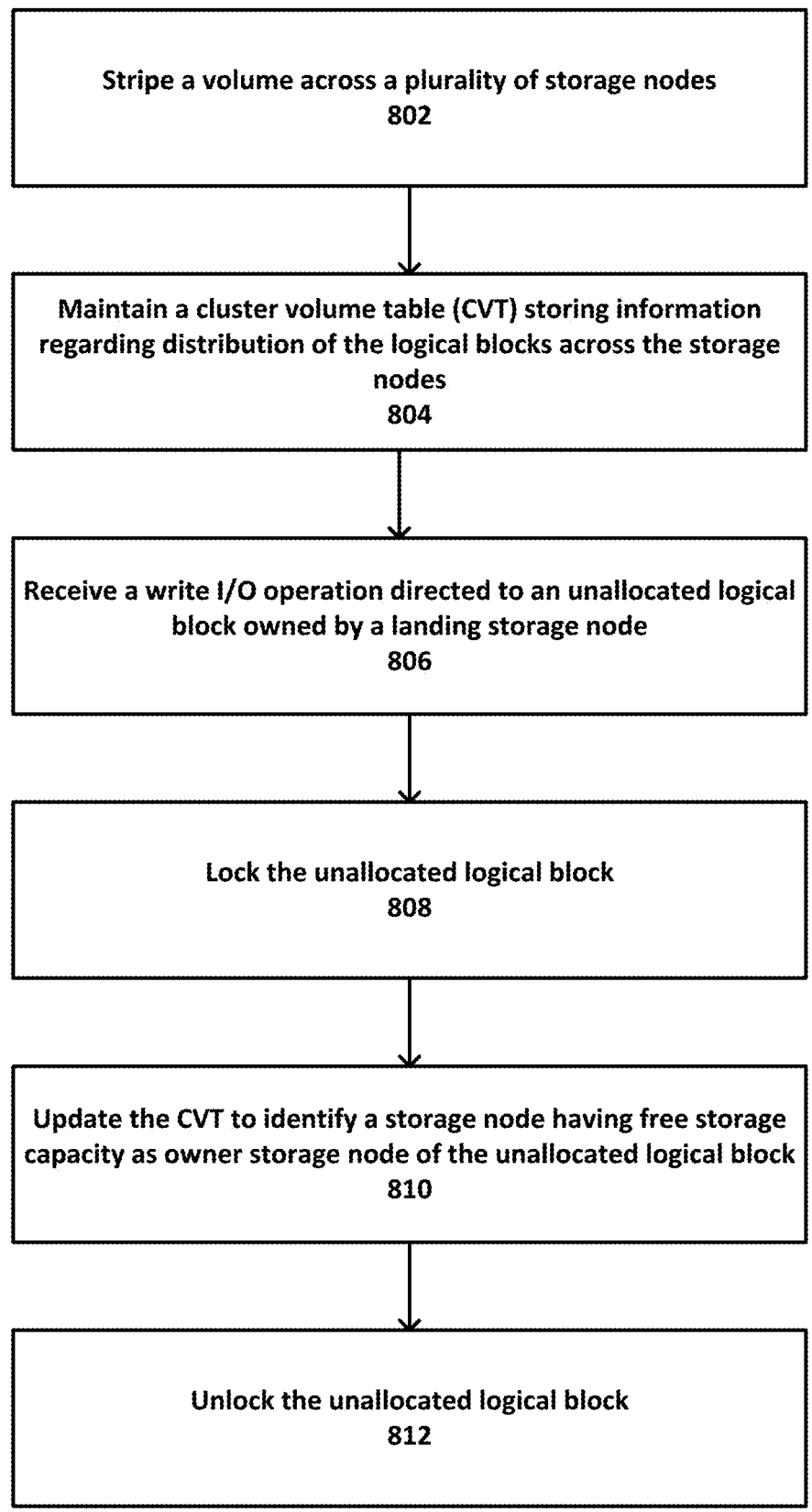
FIG. 8 is a flow diagram illustrating example operations for handling I/O operations in a storage cluster during a space crunch.

Referring now to FIG. 8, a flow diagram illustrating example operations for handling input/output (I/O) operations in a storage cluster during a space crunch is shown. At 802, a volume can be striped across a plurality of storage nodes. A plurality of logical blocks of the volume can be distributed to the storage nodes, for example, as described with regard to FIGS. 3 and 4. At 804, a cluster volume table (CVT) storing information regarding distribution of the logical blocks across the storage nodes can be maintained. The CVT can include a plurality of entries, where each of the entries in the CVT can include information identifying a respective owner storage node of a respective logical block. An example CVT is described above with regard to FIG. 3A. At 806, a write I/O operation directed to an unallocated logical block owned by a landing storage node (e.g., Node C of FIG. 6) can be received. As described above, the landing storage node can be experiencing a space crunch, i.e., it lacks free storage capacity to serve the write I/O operation. At 808, the landing storage node can lock the unallocated logical block. At 810, the CVT can be updated to identify a storage node having free storage capacity (e.g., Node A of FIG. 6) as owner storage node of the unallocated logical block. At 812, the landing storage node can unlock the unallocated logical block and the write I/O operation can proceed at the storage node having free storage capacity (e.g., Node A of FIG. 6).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for consolidating space in a storage cluster, comprising:

striping a volume across a plurality of storage nodes, wherein a plurality of logical blocks of the volume are distributed to the storage nodes;

maintaining a cluster volume table (CVT) storing information regarding distribution of the logical blocks across the storage nodes, wherein the CVT comprises a plurality of entries, and wherein each of the entries in the CVT comprises information identifying a respective owner storage node of a respective logical block;

adding a new storage node to the storage cluster, wherein a portion of the new storage node's storage capacity is reserved for space consolidation;

transferring data for one or more logical blocks from each of the storage nodes to the new storage node based on respective usage ratios of the storage nodes;

updating the CVT to identify the new storage node as owner storage node of the one or more logical blocks transferred to the new storage node;

receiving a list of logical blocks eligible for transfer from the storage nodes to the new storage node, wherein a logical block eligible for transfer is not associated with a plurality of snapshot versions; and populating a transfer array comprising the list of logical blocks eligible for transfer.

2. The computer-implemented method of claim 1, further comprising scanning the storage nodes to determine the respective usage ratios of the storage nodes.

3. The computer-implemented method of claim 2, further comprising normalizing the respective usage ratios of the storage nodes.

4. The computer-implemented method of claim 3, wherein the data for one or more logical blocks is transferred to the new storage node based on the normalized respective usage ratios of the storage nodes.

5. The computer-implemented method of claim 1, wherein the transfer array comprises a plurality of non-contiguous logical blocks.

6. The computer-implemented method of claim 1, further comprising locking a particular logical block to be transferred to the new storage node, wherein the data for one or more logical blocks transferred to the new storage node comprises data for the particular logical block.

7. The computer-implemented method of claim 6, further comprising:

notifying the storage nodes that the new storage node is the owner storage node for the particular logical block; and unlocking the particular logical block.

8. The computer-implemented method of claim 1, further comprising redistributing a plurality of unallocated logical blocks based on the respective usage ratios of the storage nodes.

9. The computer-implemented method of claim 3, further comprising redistributing a plurality of unallocated logical blocks based on the normalized respective usage ratios of the storage nodes.

10. The computer-implemented method of claim 1, wherein a first portion of the new storage node's storage capacity is reserved for space consolidation and a second portion of the new storage node's storage capacity is reserved for space redistribution.

11. The computer-implemented method of claim 1, wherein each of the entries in the CVT further comprises information identifying a respective owner storage node for remotely-owned logical block or a pointer to a system volume table (SVT) for a locally-owned logical block.

12. A non-transitory computer-readable recording medium having computer-executable instructions stored thereon for consolidating space in a storage cluster that, when executed by a storage system computer, cause the storage system computer to:
- stripe a volume across a plurality of storage nodes, wherein a plurality of logical blocks of the volume are distributed to the storage nodes;
- maintain a cluster volume table (CVT) storing information regarding distribution of the logical blocks across the storage nodes, wherein the CVT comprises a plurality of entries, and wherein each of the entries in the CVT comprises information identifying a respective owner storage node of a respective logical block;
- add a new storage node to the storage cluster, wherein a portion of the new storage node's storage capacity is reserved for space consolidation;
- transfer data for one or more logical blocks from each of the storage nodes to the new storage node based on respective usage ratios of the storage nodes;
- update the CVT to identify the new storage node as owner storage node of the one or more blocks transferred to the new storage node;
- receive a list of logical blocks eligible for transfer from the storage nodes to the new storage node, wherein a logical block eligible for transfer is not associated with a plurality of snapshot versions; and
- populating a transfer array comprising the list of logical blocks eligible for transfer.

13. The non-transitory computer-readable recording medium of claim 12, having further computer-executable instructions stored thereon that, when executed by the storage system computer, cause the storage system computer to lock a particular logical block to be transferred to the new storage node, wherein the data for one or more logical blocks transferred to the new storage node comprises data for the particular logical block.

14. The non-transitory computer-readable recording medium of claim 12, having further computer-executable instructions stored thereon that, when executed by the storage system computer, cause the storage system computer to redistribute a plurality of unallocated logical blocks.

* * * * *